US009762475B2

(12) United States Patent
Mecilati

(10) Patent No.: US 9,762,475 B2
(45) Date of Patent: Sep. 12, 2017

(54) COMMUNICATING WITH BUSINESS CUSTOMERS

(75) Inventor: Didi Avraham Mecilati, Kiryat Ono (IL)

(73) Assignee: ONE SMART STAR LIMITED, Tortola (VG)

( * ) Notice: Subject to any disclaimer, the term of this patent is extended or adjusted under 35 U.S.C. 154(b) by 970 days.

(21) Appl. No.: 12/088,332

(22) PCT Filed: Sep. 28, 2005

(86) PCT No.: PCT/IL2005/001044
§ 371 (c)(1),
(2), (4) Date: Jul. 28, 2008

(87) PCT Pub. No.: WO2007/036924
PCT Pub. Date: Apr. 5, 2007

(65) Prior Publication Data
US 2009/0037471 A1    Feb. 5, 2009

(51) Int. Cl.
*G06Q 99/00* (2006.01)
*H04L 12/721* (2013.01)
*G06Q 10/10* (2012.01)
*G06F 17/30* (2006.01)

(52) U.S. Cl.
CPC ........ *H04L 45/14* (2013.01); *G06F 17/30864* (2013.01); *G06Q 10/107* (2013.01)

(58) Field of Classification Search
CPC .. H04L 45/14; G06F 17/30864; G06Q 10/107
USPC .......................................................... 705/10
See application file for complete search history.

(56) References Cited

U.S. PATENT DOCUMENTS

| 5,553,130 | A | * | 9/1996 | Turner ................. H04Q 3/0029 379/221.08 |
| 5,774,534 | A | | 6/1998 | Mayer |
| 5,777,989 | A | * | 7/1998 | McGarvey ........ H04L 29/12066 370/254 |
| 6,065,016 | A | * | 5/2000 | Stuntebeck ......... H04M 3/4931 |
| 6,072,862 | A | | 6/2000 | Srinivasan |
| 6,122,501 | A | | 9/2000 | Gallant |
| 6,385,615 | B1 | * | 5/2002 | Haeri ................ G06F 17/30876 |

(Continued)

FOREIGN PATENT DOCUMENTS

EP     1142286 A1 * 10/2001 .............. H04M 7/00
JP     2010-078928     3/1998

(Continued)

OTHER PUBLICATIONS

MidasInc.co., Corporate Profile, http://www.midasinc.com/phoenix.zhtml?c=111698&p=irol-irhome, Dec. 22, 2008, 2 pages.

(Continued)

*Primary Examiner* — James D Nigh
(74) *Attorney, Agent, or Firm* — Weiss & Arons LLP

(57) ABSTRACT

A method including providing a business with a unified communications number for all types of customer communication and mapping the unified communications number to each address for the business issued by the communication service providers of the business. The method may also include routing communications addressed to the unified communications number to the appropriate the address as a function of the type of communication.

13 Claims, 3 Drawing Sheets

(56) References Cited

U.S. PATENT DOCUMENTS

| | | | |
|---|---|---|---|
| 6,442,549 B1* | 8/2002 | Schneider | G06F 17/30286 |
| 6,625,258 B1 | 9/2003 | Ram | |
| 6,748,057 B2* | 6/2004 | Ranalli | H04M 7/0075 |
| | | | 379/201.01 |
| 6,892,210 B1* | 5/2005 | Erickson | G06F 17/30575 |
| 6,947,571 B1* | 9/2005 | Rhoads | G06Q 30/02 |
| | | | 382/100 |
| 6,977,909 B2 | 12/2005 | Minborg | |
| 6,996,072 B1 | 2/2006 | Minborg | |
| 7,062,535 B1* | 6/2006 | Stark | G06Q 10/107 |
| | | | 707/999.001 |
| 7,248,586 B1* | 7/2007 | Hughes, Jr. | H04L 49/508 |
| | | | 370/394 |
| 7,272,625 B1* | 9/2007 | Hannel | H04L 63/0218 |
| | | | 709/200 |
| 7,320,026 B2* | 1/2008 | Adamczyk | H04L 29/12009 |
| | | | 379/88.17 |
| 7,379,543 B2* | 5/2008 | Hariri et al. | 379/201.01 |
| 7,467,140 B2* | 12/2008 | Monroe | G06F 17/30861 |
| 7,478,140 B2 | 1/2009 | King et al. | |
| 7,512,666 B2* | 3/2009 | Zhou | G06F 17/30867 |
| | | | 707/999.003 |
| 7,555,111 B2 | 6/2009 | Smith | |
| 7,706,785 B2 | 4/2010 | Lei et al. | |
| 8,165,970 B2 | 4/2012 | Avant | |
| 2002/0016765 A1 | 2/2002 | Sacks | |
| 2002/0126817 A1* | 9/2002 | Hariri | G06Q 30/018 |
| | | | 379/201.01 |
| 2003/0002639 A1* | 1/2003 | Huie | G06Q 30/04 |
| | | | 379/114.27 |
| 2003/0026268 A1* | 2/2003 | Navas | H04L 29/12009 |
| | | | 370/400 |
| 2003/0067912 A1* | 4/2003 | Mead | H04L 29/12018 |
| | | | 370/389 |
| 2003/0067926 A1* | 4/2003 | Golikeri | H04L 29/12009 |
| | | | 370/401 |
| 2003/0198338 A1* | 10/2003 | Bai | H04M 1/26 |
| | | | 379/355.01 |
| 2003/0200307 A1* | 10/2003 | Raju | G06F 12/1483 |
| | | | 709/224 |
| 2004/0015455 A1 | 1/2004 | Maarek | |
| 2004/0083184 A1 | 4/2004 | Tsuei et al. | |
| 2004/0156495 A1* | 8/2004 | Chava | H04L 45/00 |
| | | | 379/392 |
| 2004/0218747 A1* | 11/2004 | Ranalli et al. | 379/218.01 |
| 2005/0015436 A1* | 1/2005 | Singh | G06F 17/30575 |
| | | | 709/203 |
| 2005/0198085 A1* | 9/2005 | Blakey | G06Q 10/10 |
| 2005/0288013 A1* | 12/2005 | Pines | H04M 3/42008 |
| | | | 455/432.3 |
| 2007/0180075 A1* | 8/2007 | Chasman | G06F 17/30575 |
| | | | 709/223 |
| 2008/0004968 A1* | 1/2008 | Nakao | G06Q 30/02 |
| | | | 705/26.3 |

FOREIGN PATENT DOCUMENTS

| | | |
|---|---|---|
| JP | 2011-205455 | 7/1999 |
| JP | 2002-118591 | 4/2002 |
| RU | 2107401 B2 | 3/1998 |
| RU | 2273103 B2 | 3/2006 |
| WO | WO0195060 | 12/2001 |
| WO | WO2004/032002 | 4/2004 |

OTHER PUBLICATIONS

Num4Net, http:/www.num4net.com/site/index2.html, Sep. 27, 2005, 3 pages.

Matimop, "NUM4NET Israel," Industry House (14th Floor), 29 HaMered St., P.O. Box 50364, Tel Aviv 61500, Israel.

Globes Publisher Itonut (1983) Ltd., IVC Weekly Newsletter, "Num4Net Signs $15M Agreement with China Unicom," Feb. 6, 2003, PO Box 5126, Rishon Le-Zion 75150, Israel.

Globes Publisher Itonut (1983) Ltd., Hebrew Language Newspaper Advertisements, Jun. 27, 2002-Jul. 10, 2002, PO Box 5126, Rishon Le-Zion 75150, Israel.

Washington Internet Project, Cannon, Robert, "ENUM: The Collision of Telephony and DNS Policy," Oct. 20, 2001, 2358 N. Vernon Street, Arlington, VA 22207, Available at SSRN: http://ssrn.com/abstract=287492 or http://dx.doi.org/10.2139/ssrn.287492.

National Stars Center (Israel), Homepage, 8 Hachortim Street, Holon, Israel, Dated Aug. 8, 2003 by the Internet Archive <http://web.archive.org/web/20030808144238/http://stars-center.co.il/>.

National Stars Center (Israel), Contract, 8 Hachortim Street, Holon, Israel, Dated Dec. 20, 2003 by the Internet Archive <hftp://web.archive.org/web/20031220175433/http://stars-center.co.il/Contract.asp>.

National Stars Center (Israel), Customer Reference Sheet, 8 Hachortim Street, Holon, Israel, Dated Dec. 20, 2003 by the Internet Archive <http://web.archive.org/web/20031220175649/http://stars-center.co.il/CustRef.asp>.

* cited by examiner

COMMUNICATING WITH BUSINESS CUSTOMERS

FIELD OF THE INVENTION

The present invention relates to communications methods.

BACKGROUND OF THE INVENTION

The modern age may best be characterized by the overwhelming amount of information transmitted between individuals for personal and business purposes alike. An increasing number of individuals and entities communicate increasingly frequently, exchange increasingly more data, by an increasing number of means.

It is typically important to both the business providing a service to a customer, and to the customer receiving a service from a business that a dependable and convenient communication link exist between them. Customers place a high value on receiving the products and services they have purchased from a business at the price and under the terms to which they have agreed, and businesses depend on satisfied customers to ensure their viability in a competitive market. To achieve these ends, communication between customers and businesses is paramount. Customers and business representatives must talk or correspond in writing to provide and receive information about products and services, provide and receive price quotes, negotiate and sign service agreements and resolve problems which may arise.

The typical contemporary business has kept pace with the technological advances in the field of communications which have increased and diversified the methods by which customers and businesses may communicate. This is demonstrated in FIG. 1, reference to which is now made, which shows an exemplary contemporary business card 10 for Busy Business Inc., an exemplary contemporary business. As shown in FIG. 1, the contact details 12 on business card 10 include a mailing address 14 for postal deliveries, a telephone number 16 for telephone calls, a fax number 18 for fax transmissions, an SMS number 20 for receiving text messages, an email address 22 for email transmissions, and a website address 24 for Internet access.

Both businesses and customers can benefit from the convenience afforded by the quantity and variety of communications options. For example, a customer having a busy day may find that he has missed the opportunity to call his service provider during regular business hours, but the options of contacting the business outside of office hours by fax or email remain available to him.

Ironically, as evidenced by the quantity of details shown on business card 10, it is the very increase and diversification of communication options which has itself created a communications impediment. The contemporary individual is typically overwhelmed with contact details, the majority of which he cannot hope to remember. He must be equipped at the very least with an address book, or preferably, with an electronic organizer. Keeping up with ever-increasing contact details, due to the advances of communications technology, and ever-changing contact details, due to physical relocations, area-code changes, communications service provider switches, etc. has graduated from a minor inconvenience to a more bothersome aggravation. The contemporary experience of writing a quick business email in the middle of the night which will be at its destination at the start of the next business day is a welcome one and a modern convenience. However, both unwelcome and inconvenient to a similar degree, is the "b as in boy", "d as in dog" recitation required to provide an email address over the phone accurately.

Businesses in particular cannot afford to lose touch with their customers, and historically, in recognizing that it has been in their best interest to make it easier for customers to reach them, businesses have invested considerable efforts in minimizing the cost in both time and money for customers to reach them. These efforts have included business reply mail, which saves customers the cost of a stamp when communicating with the business and toll free numbers, which save customers the cost of a telephone call when calling the business. Businesses have also used toll free numbers with the name of the business spelling out the phone number using the alphanumeric keypad to help customers easily retain and retrieve their contact information. Telephone numbers have been set to jingles and seared into our memories by constant repetition on the public airwaves. However, in the modern context, these solutions are only partial due to the increased number of the means of communication and contact details.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
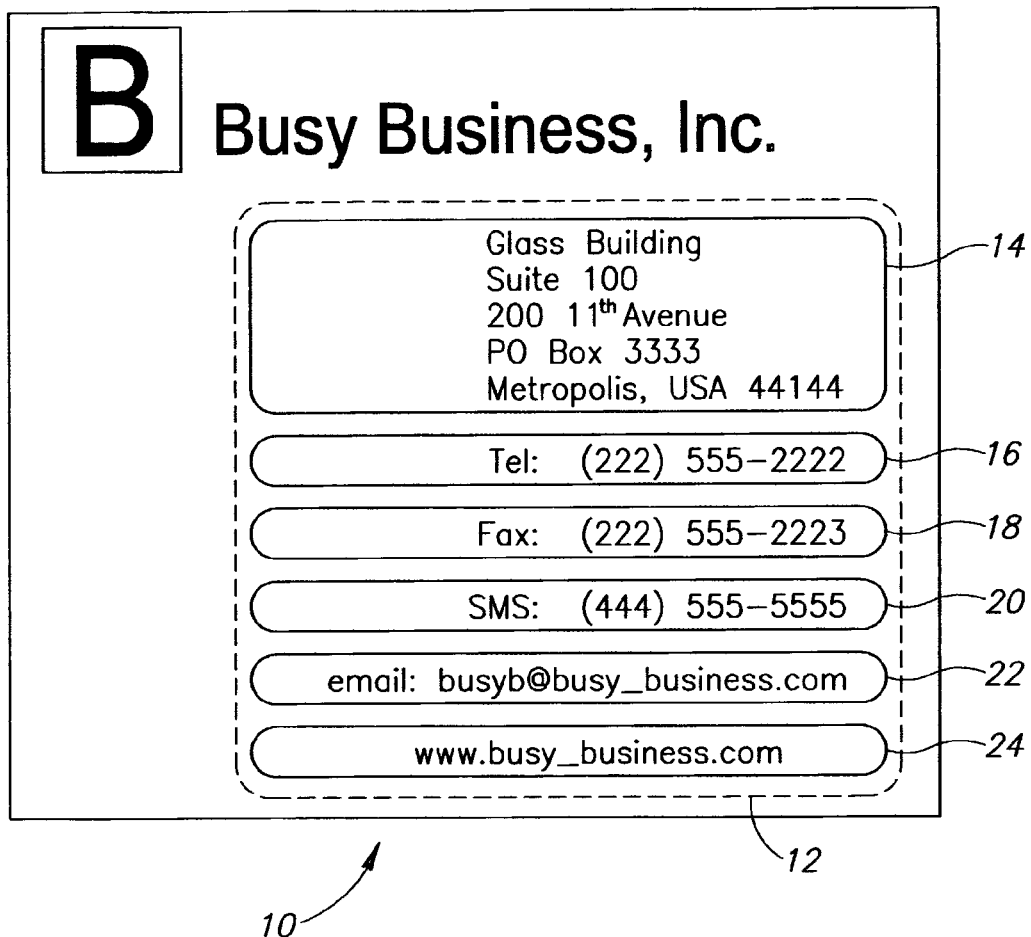
FIG. 1 is an exemplary representation of a contemporary business card.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

SUMMARY OF THE INVENTION

There is provided, in accordance with a preferred embodiment of the present invention, a method including associating a communication nickname with a business for use with all existing types of customer communication.

Additionally, in accordance with a preferred embodiment of the present invention, the method may include routing each communication for the business transmitted using the communication nickname in accordance with a communication access number associated with the type of the communication.

Further, in accordance with a preferred embodiment of the present invention, the method may include having a compact contact detail for each type of customer communication which includes the communication nickname as a major portion thereof. Still further, in accordance with a preferred embodiment of the present invention, the types of communication may include mail, fax, telephony, mobile telephony, short message service (SMS), internet and email.

There is also provided, in accordance with a preferred embodiment of the present invention, a method including providing a business with a unified communications number for all types of customer communication and mapping the unified communications number to each address for the business issued by the communication service providers of the business.

Additionally, in accordance with a preferred embodiment of the present invention, the method may include routing communications addressed to the unified communications number to the appropriate the address as a function of the type of communication.

Moreover, in accordance with a preferred embodiment of the present invention, the unified communications number may be unique to the business.

Further, in accordance with a preferred embodiment of the present invention, the types of communication may include mail, fax, telephony, mobile telephony, short message service (SMS), internet and email.

Finally, in accordance with a preferred embodiment of the present invention, the providing may include selecting a temporary unified communications number, confirming with each the communication service provider that the temporary unified communications number is not being used by any other business and, if so, mapping the unified communications number between the business and the communication access numbers assigned to the business by the communication service providers.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that the inconvenience caused by an overabundance of contact details may be overcome by taking advantage of the means by which modern communications may be routed from one communications access number to another through central routing equipment and forwarding services.

Figure 2:
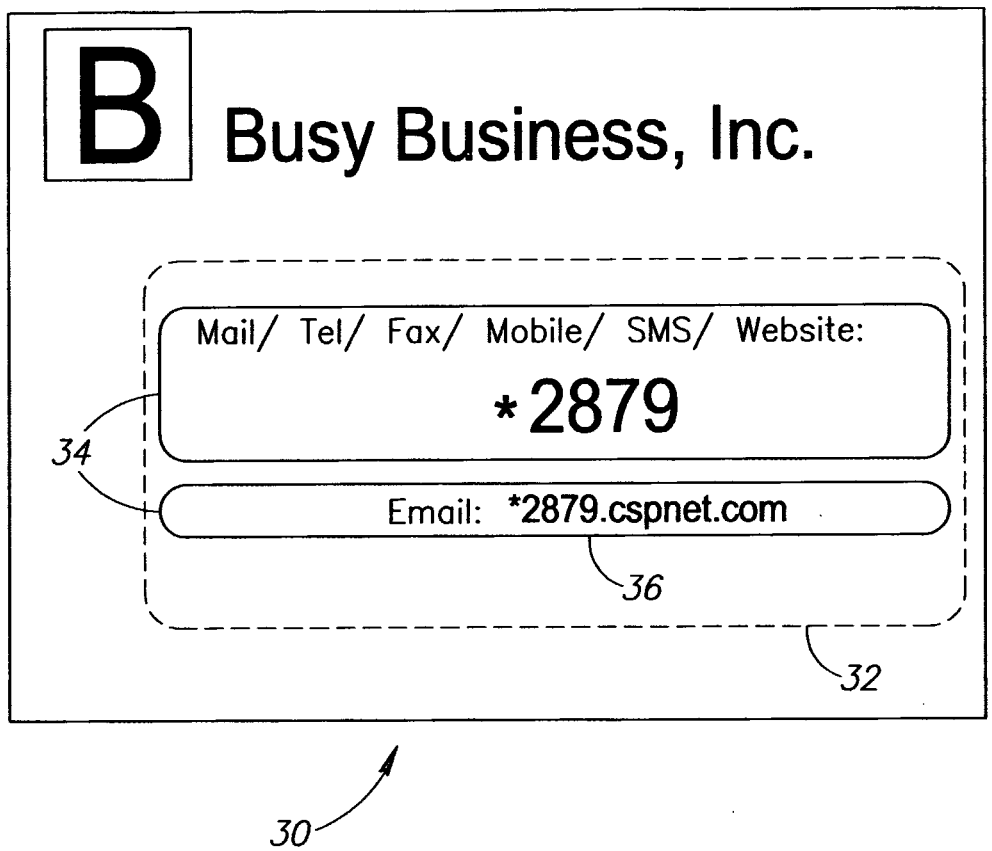
FIG. 2 is an exemplary representation of the business card shown in FIG. 1, the contact details provided on which have been compacted in accordance with a preferred embodiment of the present invention.

FIG. 2, reference to which is now made, depicts a business card 30, which includes compact contact details 32 which may, in accordance with a preferred embodiment of the present invention, replace the full-length contact details 12 provided on prior art business card 10, while not detracting from the full range of communication versatility provided by full-length contact details 12. Compact contact details 32 may all contain as their single or chief component a "communications nickname" uniquely associated with one business. For example, the communications nickname for Busy Business Inc. may be "*2879".

As shown in FIG. 2, in accordance with a preferred embodiment of the present invention, one simple, short and generally easily remembered number such as "*2879" may be substituted for nearly all of the disparate and lengthy contact details of a business. In the example shown in FIG. 2, the single contact detail "*2879" replaces the mailing address, phone number, fax number, text message number and website address of Busy Business, Inc. In accordance with a preferred embodiment of the present invention, some contact details, such as email address 36 shown in FIG. 2, may have a prefix or suffix appended to the communications nickname. In the case of compact contact details having prefixes or suffixes appended to the communications nickname, it will be appreciated that the communications nickname remains a unifying element between all of the compact contact details for a single business.

Compact contact details 32 for a business may comprise fewer communication access numbers (CANs) 34 than full-length contact details 12. For example, it is shown in a comparison between FIGS. 1 and 2 that there may be a reduction from six CANs (indicated by reference numerals 12, 14, 16, 18, 20, 22 and 24) in full-length contact details 12 to two CANs in compact contact details 32.

Figure 3:
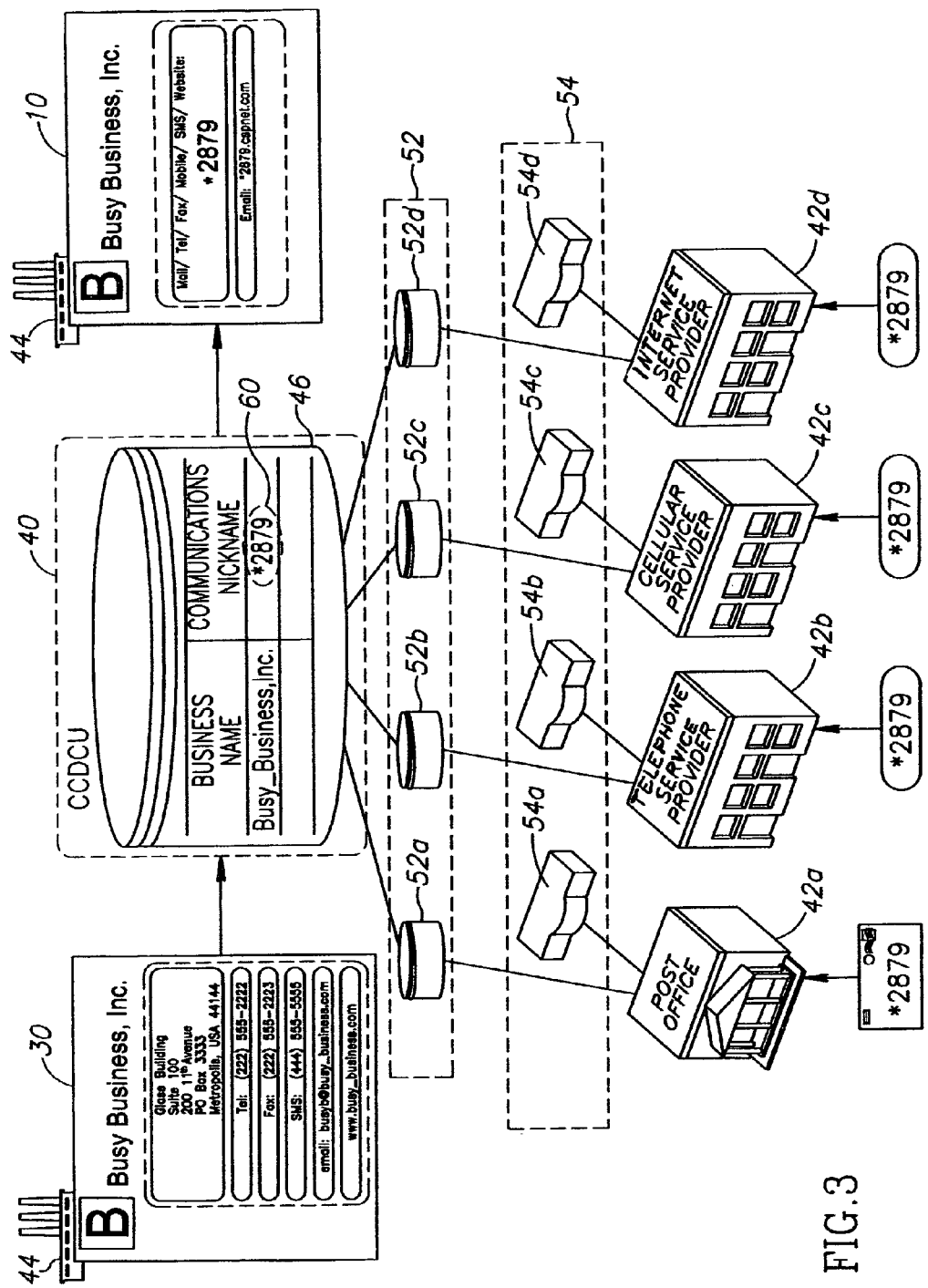
FIG. 3 is an illustration of an innovative contact details management system constructed and operative in accordance with a preferred embodiment of the present invention.

Reference is now made to FIG. 3, which illustrates a compact contact details coordination unit (CCDCU) 40, operative in accordance with a preferred embodiment of the present invention, in conjunction with currently available types of communications service providers (CSPs) 42. CCDCU 40 may be employed to coordinate assignments of unique communications nicknames 60 to businesses 44. CCDCU 40 may comprise a database 46 in which an association between each business 44 and its assigned communications nickname 60 may be recorded.

Each communication service provider 42 may provide one type of communication service to businesses 44 and may, in accordance with a preferred embodiment of the present invention, maintain and operate a database 52 and a router 54 for routing each unique communications nickname to its proper address. As shown in FIG. 3, exemplary CSPs 42 providing communications services to business 44 may include a post office 42a, one or more telephone service providers 42b, one or more cellular phone service providers 42c and one or more internet service provider 42d.

In accordance with a preferred embodiment of the present invention, each CSP 42 may operate and maintain a database 52 and a router 54. The data in each database 52 of each CSP 42 may include the names of the businesses served by the CSP, the full-length contact details assigned to each business by the CSP, and the compact contact details assigned to each business by the CSP. In accordance with a preferred embodiment of the present invention, compact contact details coordination unit (CCDCU) 40 may coordinate the availability of communications nicknames for assignment to businesses 44 with CSPs 42. A unique communications nickname may be assigned to a business 44 when it is determined by CCDCU 40, through examination of all databases 52, that the nickname has not been assigned to any other business.

When a communication is initiated by a customer using a compact CAN, the CSP 42 handling the communication may employ its router 54 to route the communication to its correct destination according to the data stored in its database 52.

For example, as shown in FIG. 3, innovative CAN "*2879" may* be associated with prior art address 14 of business 44 in the post office database, so that the post office may forward deliveries addressed to "*2879" to the Glass Building offices of business 44. Such a forwarding may be through a mechanism similar to the mail forwarding mechanism currently available from post offices. Alternatively, post office 42a may have a more sophisticated method for collecting mail addressed to a communications nickname.

Telephone company 42b may route voice calls placed to "*2879" to telephone number 16. For facsimiles sent to CAN *2879, when telephone company 42b detects the sounds of a facsimile machine, it routes the phone call to fax number 18 for the business associated with *2879.

Cellular phone call carriers may similarly maintain databases to route calls received to innovative CANs. The routing of telephone calls of any kind may be according to existing call forwarding mechanisms. Alternatively, many telephony service providers include the ability to route *xxxx type phone numbers and thus, may utilize this option. Other mechanisms for routing CAN *2879 may also be available and are included in the present invention.

In accordance with a preferred embodiment of the present invention, customers may also use the communications nickname "*2879" to contact business 44 by text message (SMS). The service provider for the text messages (e.g. a cellular telephone operator 42c, internet service provider 42d) may route text messages addressed to compact contact access numbers to an account on an internet server, such as one provided by Cellact of Raanana, Israel, where the text messages may be retrieved by business 44, or they may be forwarded to an account accessed on a computer located at business 44.

In accordance with a preferred embodiment of the present invention, customers may also type the communications nickname "*2879" into a web browser and may be routed to the website of business 44. An exemplary routing mechanism may be available through the combined operation of two applications, Netex of Israel and bweb.co.il of Israel. Netex may translate communications nicknames to the bweb.co.il website and the bweb.co.il website, through its associated database 52, may translate input phone numbers, such as the communications nickname, to regular URLs, such as the actual website address of the company.

In accordance with a preferred embodiment of the present invention, customers may also send emails to business 44 at an address containing the communications nickname of business 44. As shown in FIG. 2, an email address for business 44 may include a domain name (i.e. "csp.com") in addition to its communications nickname. Emails addressed to "*2879.csp.com" may be forwarded by the server receiving these emails to a different email address designated by business 44. In a database 52 associated with the email server, each business 44 may be associated with its communication nickname, and the forwarding email address for business 44.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A communications coordination unit comprising:
   a communications nickname database, said communications nickname database associating each of a multiplicity of businesses with its communications nickname;
   a determining unit configured to determine if a common communications nickname is available for a business across analog and digital communication service providers of said business; and
   wherein said communications nickname database is configured to communicate with router databases of said communications providers when said communications nickname database is modified, wherein each said router database comprises an address database for its associated communications provider associating at least some of said multiplicity of businesses with their addresses as issued by said communications provider;
   wherein said determining unit comprises:
   a selector to select a temporary communications nickname;
   a confirmer to confirm with each said communications provider that said temporary communications nickname is not being used by any other business; and
   a mapper to map said temporary communications nickname between said business and communication access numbers assigned to said business by said communications providers, for said temporary communications nicknames confirmed by said confirmer as not being used by any other business.

2. The unit according to claim 1 and wherein said communications nickname database is configured to support communications with said router databases associated with at least two of the following service providers: fax, telephony, mobile telephony, short message service (SMS), internet and email providers.

3. The unit according to claim 1 and wherein said communications nickname forms at least a major portion of each compact contact detail of each said business.

4. The unit according to claim 1 and wherein said communications nickname is unique to said business.

5. A method to be implemented on a database, the method comprising:
   integrating routing information in said database for businesses across analog and digital communication service providers of said businesses; and
   using said database to communicate said integrated routing information to provide rerouting information to said communication service providers, wherein said rerouting information at least indicates a unique address for communicating with each of said businesses via all of said communication service providers;
   wherein said integrating comprises, for each business:
   selecting a temporary unique address;
   confirming with each said communications provider that said temporary unique address is not being used by any other business; and
   mapping said temporary unique address between said business and communication access numbers assigned to said business by said communications providers, for said temporary unique address confirmed by said confirmer as not being used by any other business.

6. The method according to claim 5 and wherein said communication service providers comprise providers of at least two of fax, telephony, mobile telephony, short message service (SMS), internet and email.

7. A method to be implemented on a compact contact details coordination unit (CCDCU) comprising a database, the method comprising:
   using the CCDCU, providing a business with a unified communications number for all types of customer communication, wherein said all types are provided by a multiplicity of communication service providers, and wherein said all types include at least two of fax, telephony, mobile telephony, short message service (SMS), internet and email; and
   using the CCDCU, mapping, in said database said unified communications number to each address for said business issued by the communication service providers of said business;
   wherein said providing comprises:
   using said CCDCU, selecting a temporary unified communications number;

using said CCDCU, confirming with each said communication service provider that said temporary unified communications number is not being used by any other business;

using said CCDCU, defining said unified communications number as said temporary unified communications number for each said temporary unified communications number confirmed as not being used by any other business during said confirming; and using said CCDCU, mapping said unified communications number between said business and communication access numbers assigned to said business by said communication service providers.

8. The method according to claim 7 and wherein said unified communications number is unique to said business.

9. A method to be implemented on a database, the method comprising:

providing rerouting information from the database to enable communication service providers of a business to provide a unified communications nickname for use with analog and digital communication service providers of said business, wherein said communication service providers comprise at least two communication service providers;

wherein said providing comprises:

selecting a temporary communications nickname;

confirming with each said communication service provider that said temporary communications nickname is not being used by any other business;

defining said unified communications number as said temporary unified communications number for each said temporary unified communications number confirmed as not being used by any other business by said confirming; and mapping said unified communications nickname between said business and communication access numbers assigned to said business by said communication service providers.

10. The method according to claim 9 and comprising:

for each said communication service provider, having a compact contact detail which includes said communications nickname as a major portion thereof.

11. The method according to claim 9 and wherein said communication service providers comprise providers of at least two of fax, telephony, mobile telephony, short message service (SMS), internet and email.

12. The method according to claim 9 and wherein said providing comprises:

mapping said unified communications nickname to each address for said business issued by said communication service providers of said business.

13. The method according to claim 9 and wherein said unified communications nickname is unique to said business.

* * * * *